(12) United States Patent
Tingle

(10) Patent No.: US 10,677,738 B2
(45) Date of Patent: Jun. 9, 2020

(54) COLLAPSIBLE LIGHT TUNNEL

(71) Applicant: Charlie Tingle, Dripping Springs, TX (US)

(72) Inventor: Charlie Tingle, Dripping Springs, TX (US)

(73) Assignee: Hail Spotter L.L.C, Dripping Springs, TX (US)

( * ) Notice: Subject to any disclaimer, the term of this patent is extended or adjusted under 35 U.S.C. 154(b) by 0 days.

(21) Appl. No.: 16/161,420

(22) Filed: Oct. 16, 2018

(65) Prior Publication Data

US 2019/0113464 A1 Apr. 18, 2019

Related U.S. Application Data

(60) Provisional application No. 62/572,679, filed on Oct. 16, 2017.

(51) Int. Cl.
| | |
|---|---|
| *G01N 21/88* | (2006.01) |
| *F21V 19/00* | (2006.01) |
| *F21V 21/005* | (2006.01) |
| *G01N 21/01* | (2006.01) |
| *F21V 21/30* | (2006.01) |
| *F21Y 115/10* | (2016.01) |
| *F21W 131/411* | (2006.01) |
| *F21S 2/00* | (2016.01) |

(52) U.S. Cl.
CPC ..... *G01N 21/8806* (2013.01); *F21V 19/0015* (2013.01); *F21V 21/005* (2013.01); *F21V 21/30* (2013.01); *G01N 21/01* (2013.01); *G01N 21/8803* (2013.01); *F21S 2/005* (2013.01); *F21W 2131/411* (2013.01); *F21Y 2115/10* (2016.08); *G01N 2021/8816* (2013.01); *G01N 2201/021* (2013.01); *G01N 2201/024* (2013.01); *G01N 2201/062* (2013.01)

(58) Field of Classification Search
CPC .......... G01N 21/8806; G01N 21/8803; G01N 21/01; G01N 2021/8816; G01N 2201/062; G01N 2201/024; G01N 2201/021; F21V 19/0015; F21V 21/005; F21V 21/30; F21Y 2115/10; F21S 2/005; F21W 2131/411

See application file for complete search history.

(56) References Cited

U.S. PATENT DOCUMENTS

| | | | | |
|---|---|---|---|---|
| 8,029,164 B2 * | 10/2011 | Livesay | ............ | G02B 27/0994 362/247 |
| 8,348,474 B1 * | 1/2013 | Livesay | ............ | G02B 27/0994 362/310 |
| 8,450,756 B2 * | 5/2013 | Strickler | ............ | H01L 25/0753 257/91 |
| 10,393,330 B2 * | 8/2019 | Tischler | .................... | F21K 9/90 |
| 2005/0207152 A1 * | 9/2005 | Maxik | ........................ | F21K 9/90 362/231 |
| 2009/0316406 A1 * | 12/2009 | Livesay | ................ | H01L 25/075 362/249.02 |

* cited by examiner

*Primary Examiner* — Kevin Quarterman
(74) *Attorney, Agent, or Firm* — Kirk Dorius

(57) ABSTRACT

A collapsible light tunnel includes pairs of vertical, (optional angled) and overhead light panels collapsibly coupled together and moveable between a stowed position and a deployed position. The light panels include strips of LED lights, light diffusers, and fixtures/brackets for maintaining the panels in the deployed position. The overhead (and angled) light panels are collapsible adjacent the vertical panels in the stowed position.

13 Claims, 7 Drawing Sheets

COLLAPSIBLE LIGHT TUNNEL

CROSS-REFERENCE TO RELATED APPLICATIONS

This application claims priority to U.S. Provisional Patent Application Ser. No. 62/572,679, filed on Oct. 16, 2017, which is incorporated herein in its entirety by reference.

FIELD OF INVENTION

This invention generally relates to surface inspection lighting and in particular to modular systems for inspection lighting.

BACKGROUND OF THE INVENTION

Inspection lighting systems are used to examine highly-finished surfaces such as automotive paint finishes. Inspection lighting systems are also used to assess damage to automotive paint finishes and body panels, e.g., following hail damage to a vehicle. Such systems generally include a light booth or fixed bank of lighting under which the vehicle is passed or parked during visual inspection. Some systems include multiple banks of lights configured in an arch or "tunnel" to illuminate the vehicle body panels from the sides, top, and intermediate angles. Such lighting tunnels are typically permanently installed at an autobody shop or at an estimator shop and damaged vehicles are transported to these shops for inspection following hail damage. In many cases, entire fleets of vehicles must be transported between large auto dealers and the estimator/autobody shops following hail damage for inspection and repair.

Accordingly, improvements are sought in facilitating onsite inspections of vehicles following.

SUMMARY OF THE INVENTION

Applicant has conceived of a modular, lightweight, collapsible light inspection tunnel that may be readily transported and assembled onsite for mobile inspection of damaged vehicle fleets. In general, the present invention provides a set of modular light panels configured to be individually moveable and assembled together at the panel edges into a fixed light tunnel geometry. In some embodiments, the light panels comprised rows of LED, e.g., LED light strips. In some embodiments, the LED strips are rigid. In some embodiments, the LED strips are flexible. In some embodiments, the vertical side panels comprise strips of LEDS arranged substantially vertically and the angled light panels comprise strips of LEDs arranged substantially horizontally, or any combination of LED positioning.

In some embodiments, the light panels include brackets for attachment of the panel to an adjacent panel or base support structure. In some embodiments, the brackets are adjustable such that the light tunnel may be configured to be of different widths and/or heights.

In some embodiments, one or more lighting strips within an individual lighting panel are connected by a common power circuit. In some embodiments, lighting strips of adjacent lighting panels are connectible to a common power circuit by a mating electrical connection. In some embodiments, the mating electrical connection may be separated during disassembly for easy of transport of individual panels.

In various embodiments, multiple combinations of vertical and overhead panels may be used to setup a modular lighting tunnel. In some embodiments, the collapsible light tunnel includes two vertical side-member light panels, two angled light panels and one or more overhead light panels. In some embodiments, the light tunnel includes two overhead light panels and the two vertical side-member panels are each as long as a combination of two of the angled light panels, two of the overhead panels, or one of each of an angled panel and an overhead panel. In some embodiments, the side-members are configured as the outermost panels in a modular stack of the collapsed light tunnel. In some embodiments, the side member panels are configured to at least partially receive one or more of an angled panel and an overhead panel.

The light tunnel panels are movable between a collapsed/stored position and a deployed/erected position. In some embodiments, the light tunnel panels remain coupled in the collapsed position and in the deployed position. In some embodiments, the panels are hingedly coupled. In some embodiments, a series of lock pins may be used to connect the panels or groups of panels together.

In some embodiments, the light tunnel is separable into two sets of panels, each set including a side-member panel, angled panel and overhead panel. Each set of panels is collapsible and expandable into first and second halves of the light tunnel. In some embodiments, each set of light panels is electrically coupled together. In some embodiments, the two sets are electrically couplable, e.g., via a multiprong mating electrical connector.

In some embodiments, the light panels are fixed together along at least one of their respective adjacent edges and adjacent corners. In some embodiments, adjacent panels are supported in an erected configuration by brackets integrated into the panel housing structure. For example, the brackets may be slidably or hingedly associated with one or more panels and may be maintained in position by a spring-biased pin housed within the bracket or panel. In some cases the panels are supported in an erected configuration by removable brackets. In some cases, the removable brackets are held in place by removable fasteners, e.g., bolts, D-ring pins, etc. In some cases, lock pins may be used to make each panel individually detachable. In some cases, lockable hinges may be used to provide additional rigidity to the light tunnel in the deployed position.

Casters or other movable support may be provided at the bottom of the light tunnel to allow for movement of the tunnel relative to a vehicle position under the tunnel. Similarly, casters may be provided along a side edge of the panel for ease of transport in the collapsed state or during assembly.

In some cases, one or more of the light panels includes a flexible light diffuser or reflector such as a fabric stretched over a frame. For example, a first front panel fabric may be selected to diffuse the LED light and a second rear panel fabric may be selected to reflect the light towards the front fabric panel. In some embodiments, a fabric panel is removable from a frame of the light tunnel for ease of storage, repair, or cleaning. Suitable fabrics may include Polyamide/Spandex and Polyester/Spandex.

In some embodiments, the tunnel frame or other support structure may be constructed of any combination of metals (e.g., aluminum), composites (fiberglass), or plastics (corrugated plastic sheets). In some embodiments, rigid or flexible cross-bracing may be used to provide additional rigidity to a semi-rigid frame.

In some embodiments, the tunnel includes two arched halves connected at the apex. The arched halves may include arcuate frame legs supporting the LEDs and a fabric panel.

A base portion may provide a surface to apply weights to provide additional stability to the tunnel.

In some embodiments, the modular panels include fabric stretched over panel frames to form a diffuser. LED strips are positioned behind the fabric diffuser panels. The fabric may be readily detached from the panel frame such that the tunnel and tunnel panels are fully collapsible for transport and storage. In some embodiments, the panel frames include diagonal cross-member stiffeners. In some embodiments, a rear fabric/material extends across the back of the panel, e.g., as a dust shield, and/or LED strip support. The rear panel may be made from corrugated plastic to protect the LED strips and provide rigidity. Foam supports/spacers may be positioned between the diffuser and the rear fabric/panel, e.g., about the same thickness as LED strips 214.

The present invention contemplates various mechanisms for coupling modular light panels into a light tunnel. In some embodiments, the panels are coupled with fixed edge brackets. In some embodiments, the panels are coupled with adjustable edge brackets. In some embodiments, the panels are coupled with angled edge brackets configured to maintain adjacent panels in position in the deployed position.

Advantages of the collapsible light tunnel include: modularity, portability, adjustability, better estimates of damage, fewer repair supplements required, and improved quality control after repairs are completed.

Depending on the application, the light strips can be arranged and configured with any combination of reflectors, diffusers, multi-colored LEDs, dimmers, remote controls, and the like.

Another advantage of the present invention is the various possibilities for the positioning of the light panels at a fixed distance or angle relative to the vehicle surface.

BRIEF DESCRIPTION OF THE DRAWINGS

A more complete understanding of the present invention may be derived by referring to the detailed description and claims when considered in connection with the Figures, wherein like reference numerals refer to similar elements throughout the Figures.

DETAILED DESCRIPTION

Figure 1:
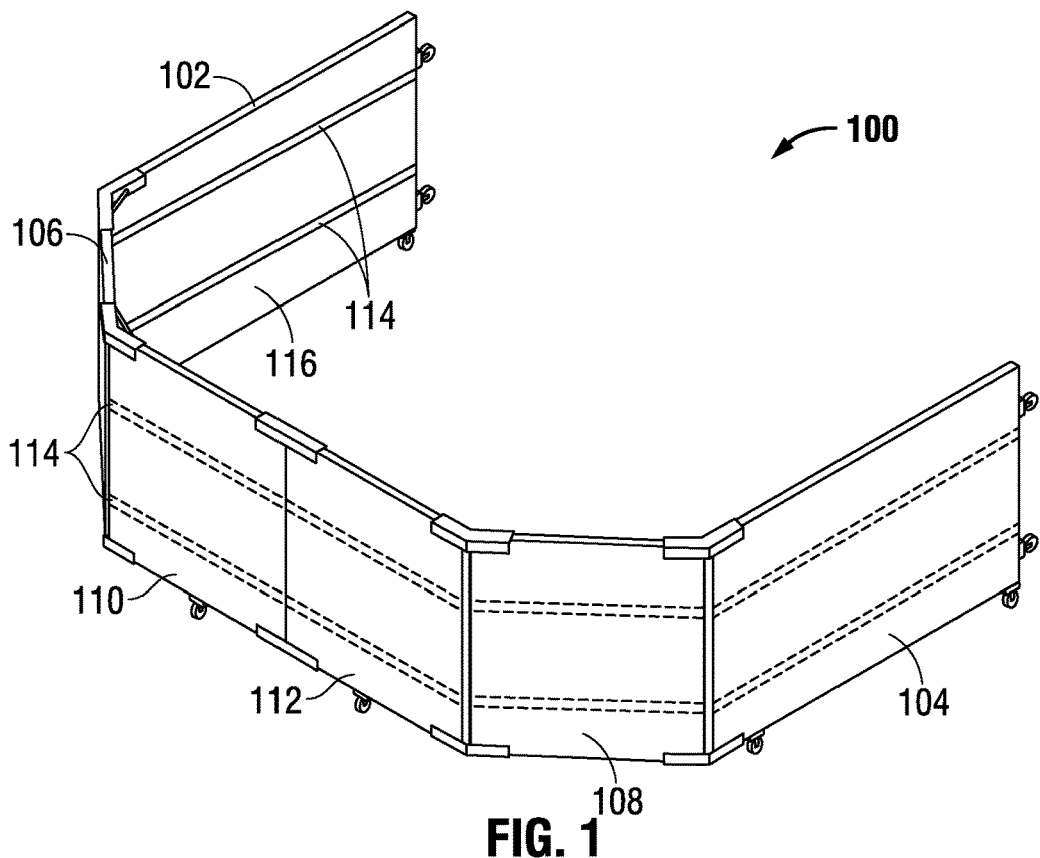
FIG. 1 is a perspective view of a collapsible light tunnel according to one embodiment.
Figure 2:
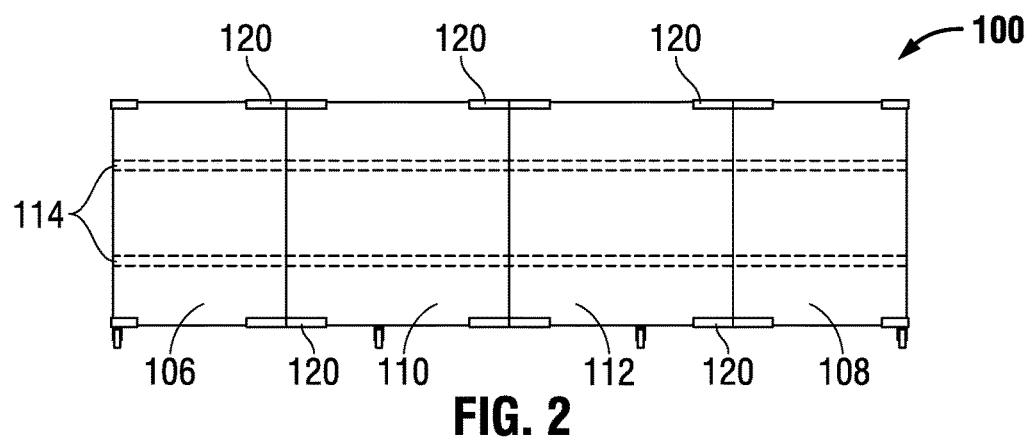
FIG. 2 is a top view of the collapsible light tunnel of FIG. 1.
Figure 3:
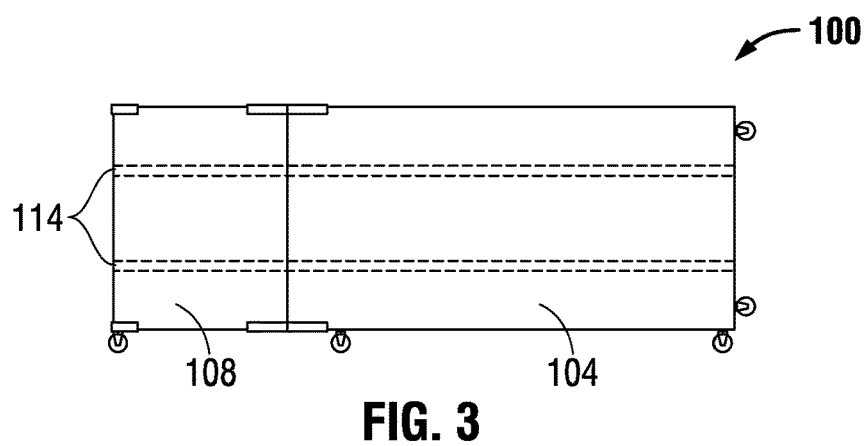
FIG. 3 is a side view of the collapsible light tunnel of FIG. 1.
Figure 4:
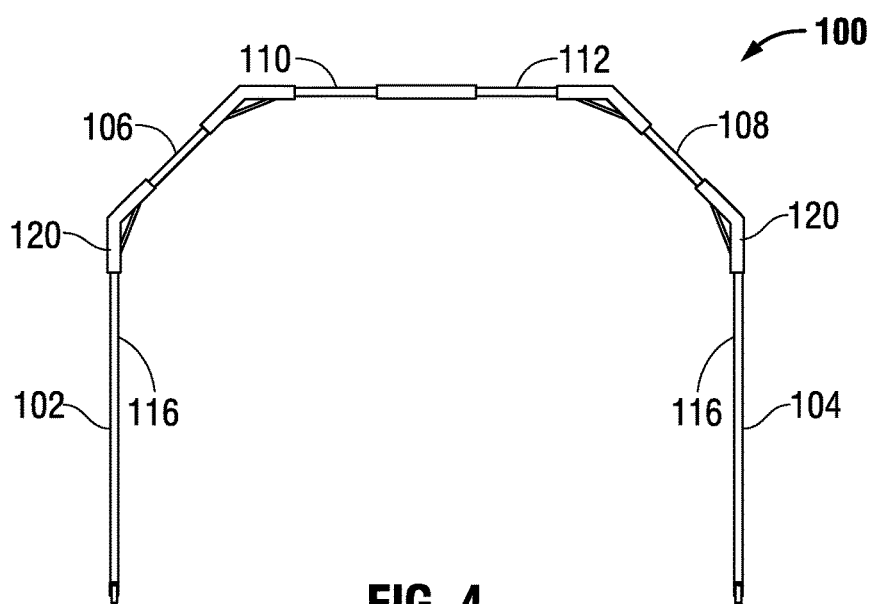
FIG. 4 is a front view of the collapsible light tunnel of FIG. 1.
Figure 5:
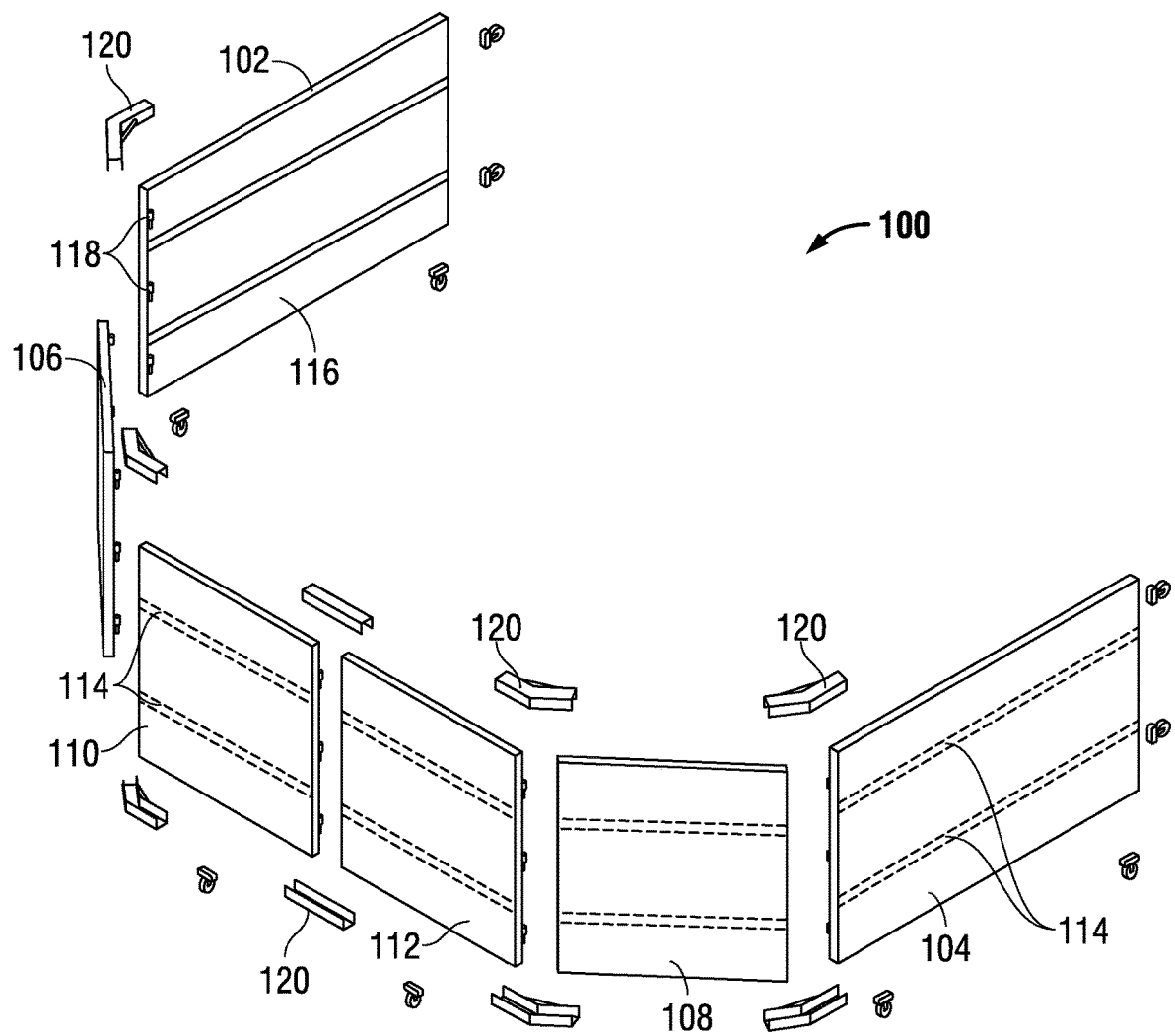
FIG. 5 is an exploded view of the collapsible light tunnel of FIG. 1.

The following description is of exemplary embodiments of the invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, lights, brackets, support mechanisms and the like and still fall within the scope of the present invention. Thus, the detailed description herein is presented for purposes of illustration only and not of limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

In the following description, certain terminology is used to describe certain features of one or more embodiments of the invention. For example, the term light or "light strip" as described herein may include, but is not necessarily limited to, LEDs strings and tube LEDs. The light panels housing the light strips may be constructed from a wide variety of materials including, but not necessarily limited to, aluminum, composites, plastic, carbon fiber and the like. The light panels may include any number of reflectors, diffusers, dimmers, remote controls, and the like. In some cases, the light strips comprise tube LEDs without the need for other diffusers or other protective light strip cover.

In accordance with various aspects of the present invention, a collapsible tight tunnel is described for mobile on-site inspection of vehicle surface finishes. The present invention may be used to assess panel damage after a hail storm or for quality control after panel repairs are completed. The light tunnel may be used for any number of surface inspection purposes. That being said, the present invention is described herein in the exemplary context of an inspection tunnel for hail damage.

The terms bracketry, hinges and pins, as used herein, include any hardware suitable to allow for or prevent relative movement of two adjacent panels as the case may be. Suitable hardware may be of any suitable material, shape or size.

FIGS. 1-5 illustrate different views of a collapsible light tunnel 100. Collapsible light tunnel 100 according to one embodiment of the present invention includes first vertical light panel 102, second vertical light panel 104, first angled light panel 106, second angled light panel 108, first overhead light panel 110, and second overhead light panel 112. First and second light panels 102-112 include LED light strips 114 and diffusers 116. Adjacent first panels 102, 106 and 110 and adjacent second panels 104, 108, and 112 are collapsibly coupled by hinges 118 to be movable between a stowed position and a deployed position. Brackets 120 serve to maintain the panels in the deployed position.

LED light strips 114 are electrically coupled to a power supply 122. LED light strips 114 may be configured and arranged similarly or differently within each panel. For example, LED light strips 114 may be vertically arranged within first and second vertical side panels 102 and 104 and may be horizontally arranged within first and second angled light panels 106 and 108. Any number of LED light strips 114 or other arrangements of LEDs may be used in any of panels 102-112.

Hinges 118 may be configured as any manner of coupling or bracketry capable of allowing coupled panels to remain coupled during movement between the stowed position and the deployed position. Of course, in some embodiments, the panels are fully separable during transport, e.g., via separable panel connectors/hinges. The hinges are positioned on the inside of the tunnel between the vertical side panels 102, 104 and the angled (e.g., 45 degree) panels 106, 108 and between the angled panels 106, 108 and the top horizontal panels 110, 112. The hinges are positioned on the outside of tunnel between the top horizontal panels 110, 112. This allows the top horizontal panels 110, 112 and angled panels 106, 108 to fold inward relative to the tunnel profile into a stowed position alongside vertical side panels 102, 104.

Positioning brackets 120 are placed across the top corners of vertical side panels 102, 104 and the adjacent bottom corners of angled panels 106, 108, an similarly across the top corners of the angled panels 106, 108 and the adjacent corners of horizontal panels 110, 112. Horizontal panels 110, 112 are connected by two straight brackets in the middle of the tunnel arch on one or both sides of the tunnel. A hole or aperture through each bracket 120 and through the structural edge of panels 102-112 receive a fastener, e.g., D-ring, to secure the panels together in the deployed position.

In one embodiment, six individual panels 102-112 are hinged together to form the collapsible light tunnel (e.g., two vertical side panels, two angled panels, and two horizontal panels). Vertical side panels 102, 104 may be sized to be twice as long as the angled or horizontal panels 106-112, or to be at about as long as the combined respective angled and horizontal panels 106-112. For example, angled panels 106, 108 may be shorter than horizontal panels 110, 112, but the combined length of both may equal that of the respective vertical side panel 102, 104. This sizing allows the tunnel panels to fold into a stowed stack by folding the tunnel in on itself in the form of a letter M.

Brackets 120 may be configured as any structure suitable to maintain adjacent panels in respective deployed positions during use of collapsible light tunnel 100. Brackets 120 may be secured to respective panels by removable fasteners such as bolts, pins, D-rings and the like.

Figure 6:
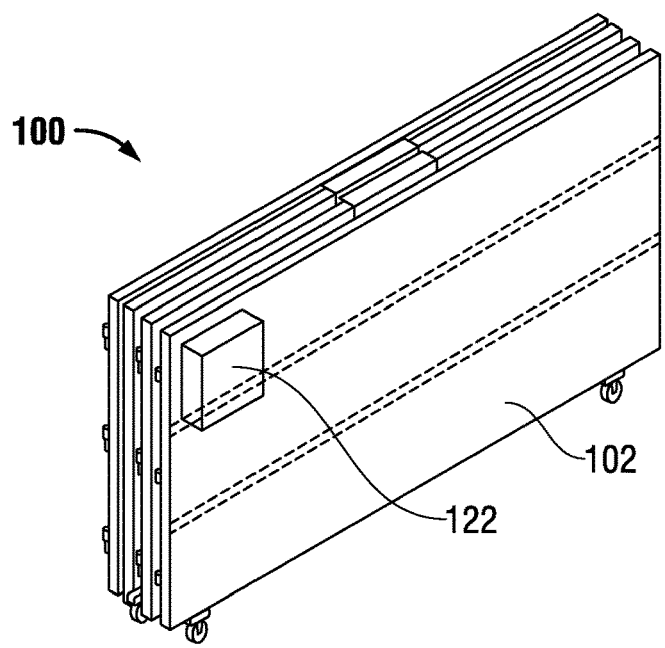
FIG. 6 illustrates a side view of a stowed collapsible light tunnel according to one embodiment wherein the light panels are stacked for transport.

With reference to FIG. 6 collapsible light tunnel 100 may be collapsed into a stowed/stacked position for transport or storage. In the stowed position, first angled panel 106 and first overhead panel 110 may fold adjacent first vertical light panel 102 in a stacked arrangement. The stacked arrangement of first panels can be moveable separate from the corresponding stack of second panels 104, 108, 112. In some embodiments, the first and second stacks of first and second panels may remain coupled in the stowed position and may be transported as a full stack of light panels for a full light tunnel. In some embodiments, first and second vertical light panels 102, 104 include handles for lifting the first and second stacks. In some embodiments, the first and second vertical light panels 102, 104 include straps, latches or other structures for maintaining the first and second stacks in the stowed/stacked position during transport.

Figure 7A:
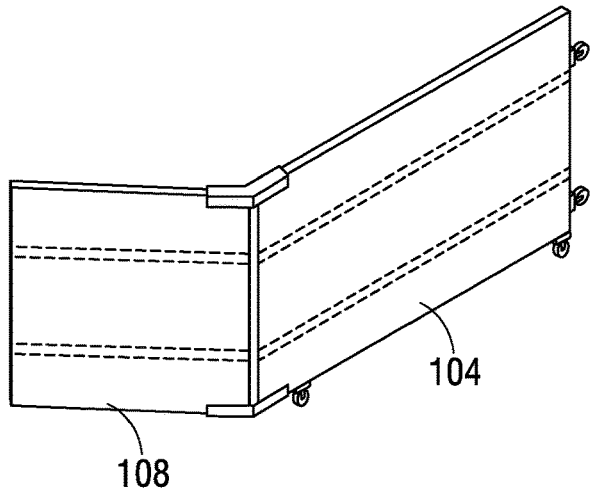
FIGS. 7A-E show the step-by-step assemblage of a collapsible light tunnel according to FIGS. 1-6.
Figure 7B:
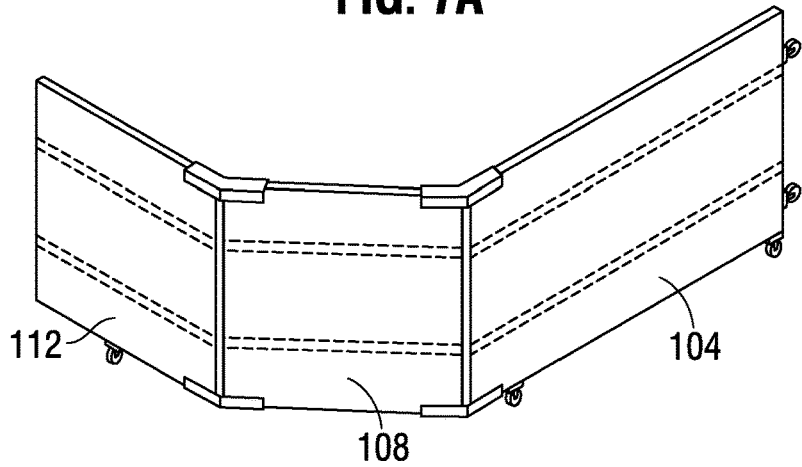
Figure 7C:
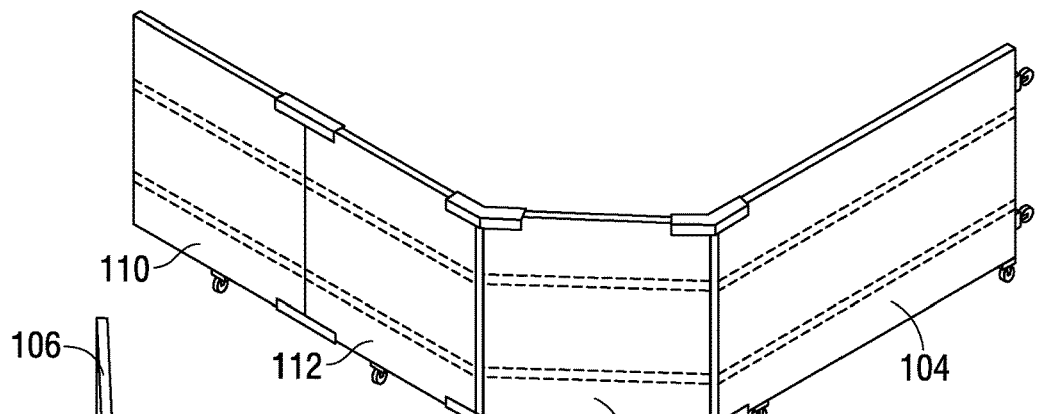
Figure 7D:
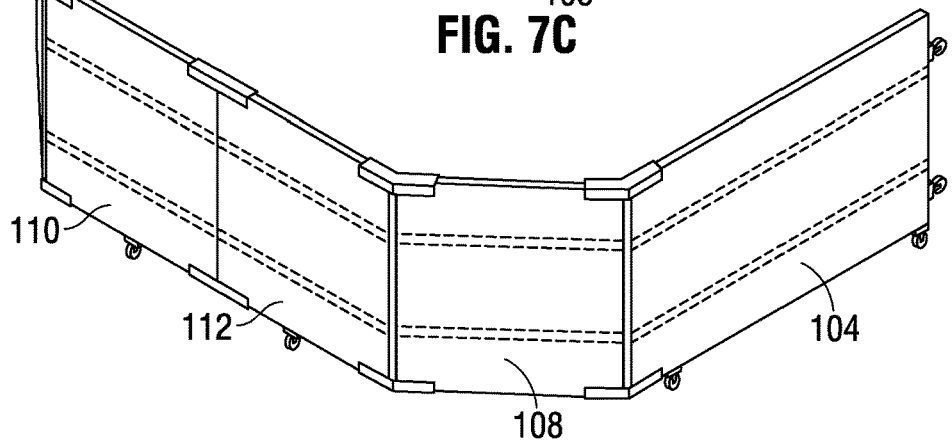
Figure 7E:
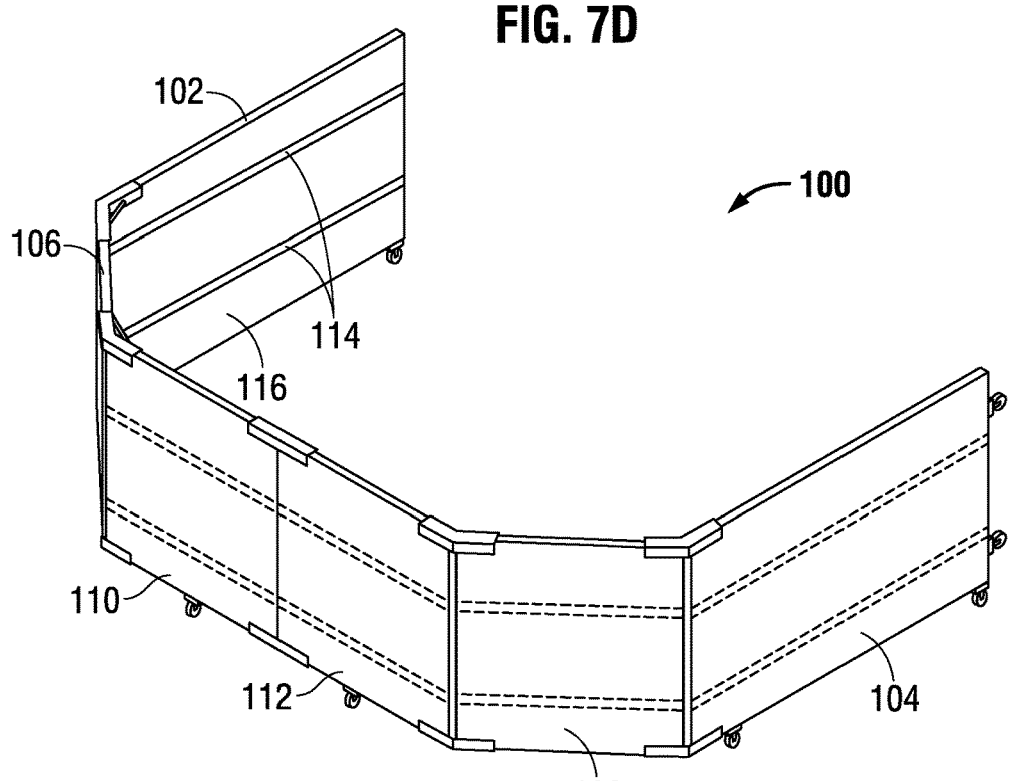

FIGS. 7A-D shows the step-by-step assemblage of collapsible light tunnel 100 according to FIGS. 1-6. In FIG. 7A, tunnel 100 is depicted initially in a first stowed position. In FIGS. 7B-C First angled panel 106 and first overhead panel 110 are pivot away from first vertical panel 102 into an arched deployed position. Second panels 104, 108, 112 are similarly rearranged into an arched deployed position by bending of hinges 118 . . .

Brackets 120 are secured to respective adjacent panels to maintain panels 102-112 in the deployed position. Brackets 120 may be secured by any suitable structural means, e.g., fasteners, snap-fit, sliding channels, and the like to prevent hinges 118 from collapsing until brackets 120 are removed or repositioned. Once light tunnel 100 has been fixed in the deployed position by brackets 120, it may be lifted into an upright position. In some embodiments, light tunnel 100 is sized to receive a portion of vehicle thereunder for visual inspection of the surface with the benefit of intense light from multiple angles.

To collapse tunnel 100, the process is simply reversed, i.e., the tunnel is laid on its side, brackets 120 are removed, respective first and second panels are folded into a stack and respective first and second stacks, or the entire stack, are secured together for storage and transport.

Figure 8:
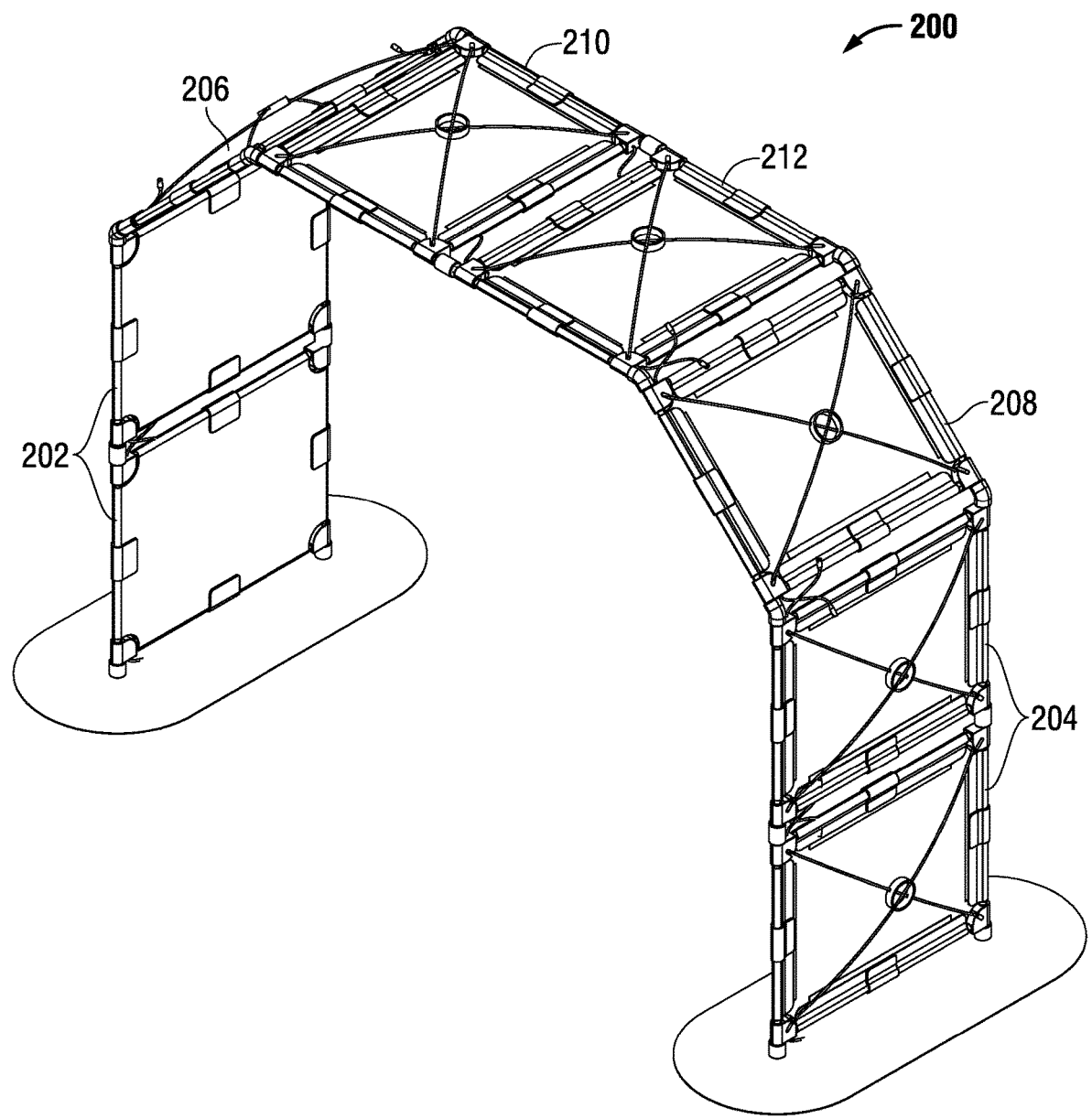
FIG. 8 illustrates a collapsible light tunnel according to another embodiment.
Figure 9:
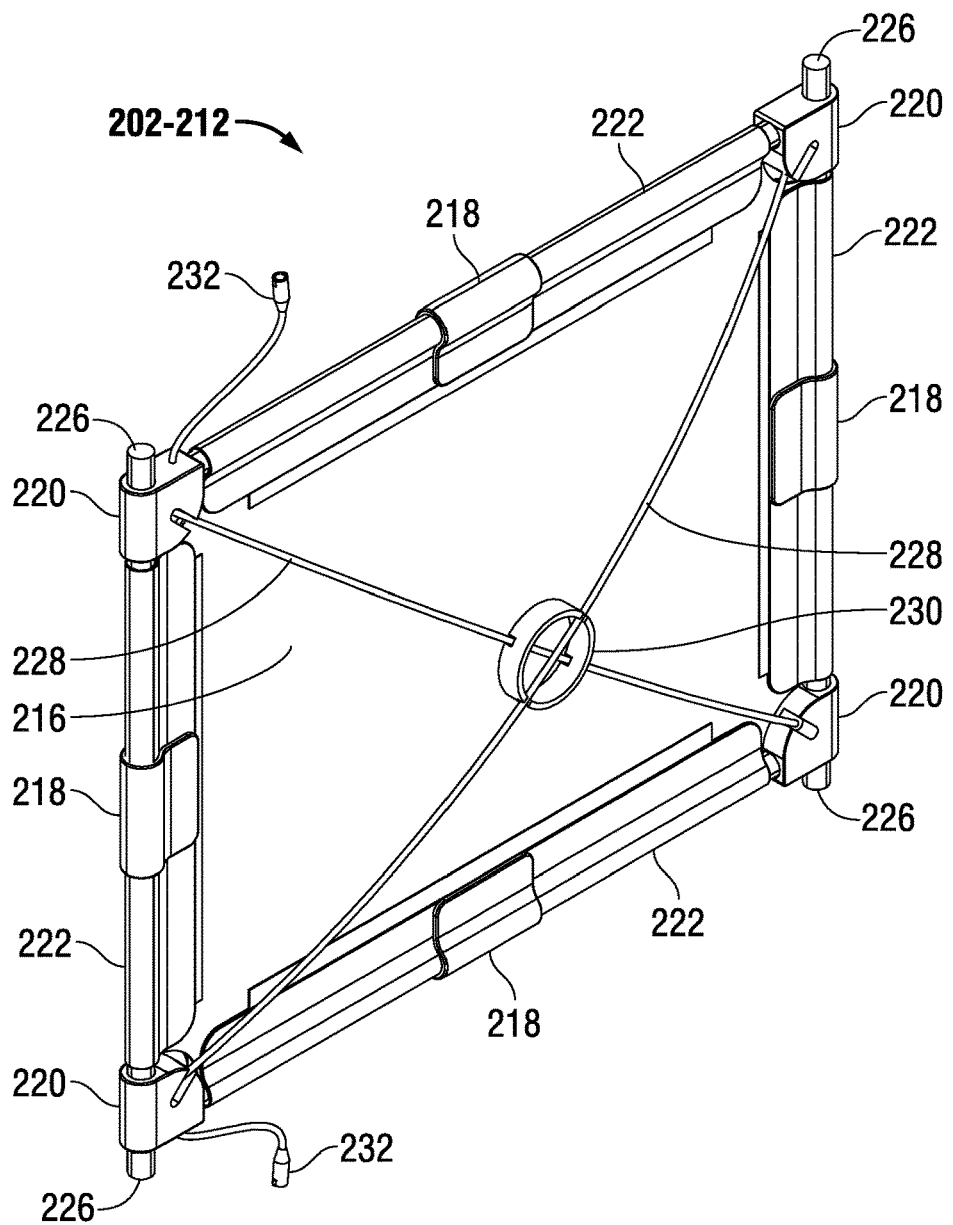
FIG. 9 illustrates a light panel for use in the collapsible light tunnel panel of FIG. 8.
Figure 10:
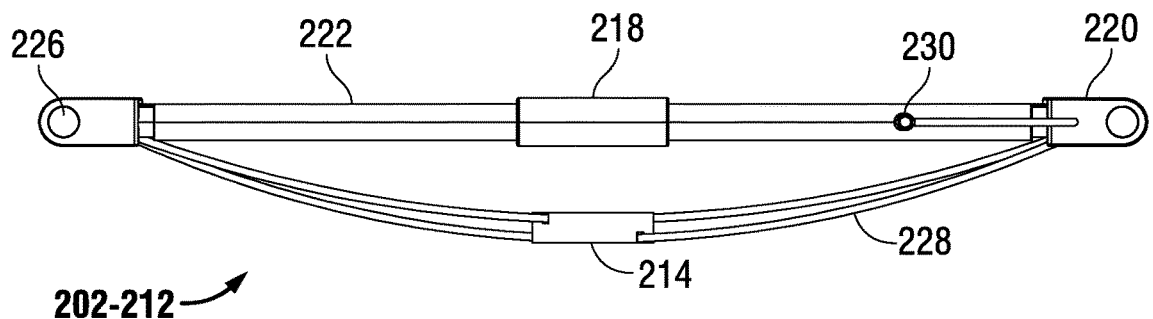
FIG. 10 illustrates a top view of the light panel of FIG. 9 for use in the collapsible light tunnel of FIG. 8.
Figure 11:
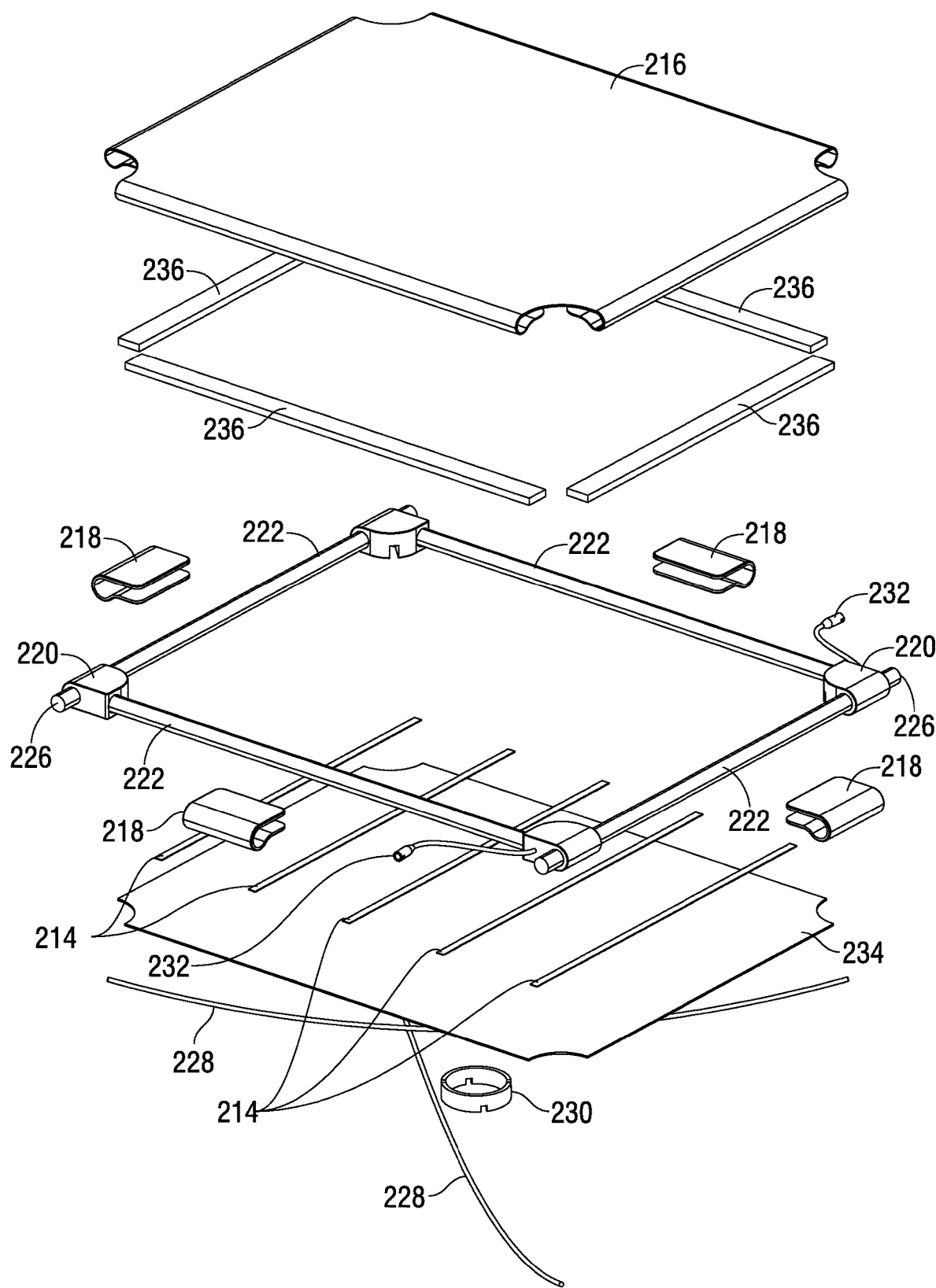
FIG. 11 illustrates an exploded perspective view of the light panel of FIG. 9 showing a fabric over pipe frame design for use in the collapsible light tunnel of FIG. 8.

FIGS. 8-11 illustrate a collapsible light tunnel according to another embodiment. With reference to FIG. 8, collapsible light tunnel 200 includes a series of light panels 202-212, including pairs of vertical side light panels 202-204, angled light panels 206-208, and overhead light panels 210-212. Light panels 202-2012 each include a series of LED strips 214 positioned behind a diffuser 216. Diffuser 216 is supported, e.g., stretched between, frame members 222, which are secured at their ends by corner fixtures 220.

Diffuser 216 may include fabric secured to frame members 222 by removable frame clips 218. Alternatively, diffuser 216 may comprise a semi-rigid fabric/material or even a rigid diffuser material. Additional panel rigidity is provided by crossmembers 228 extending diagonally between opposed corner fixtures 220. A central crossmember fixture 230 secures crossmembers 228 near their midpoints. Any number, combination or form of frame, stiffeners, clips, crossmembers may be used in any of panels 202-212. The diffuser panel may be a fabric panel stretched over a pipe frame with cross-bracing.

Corner fixtures 220 include an attachment point 226 configured to secure two adjacent light panels together. Attachment points 226 may be configured at any angle to support adjacent light panels in a desired configuration, e.g., coplaner, angled, arched and the like. Attachment points 226 may be configured with a quick-release mechanism, e.g., with a snap-fit, friction-fit, lugged, threaded, or other suitable connection.

LED strips 214 may be semi-rigid, rigid, or pliable light stings/strips configurable to achieve a desired lighting coverage and intensity adjacent the diffuser. LED strips 214 may be jointly wired within a panel, or across multiple panels, e.g., with electrical couplers/connectors 232 positioned between panels. In other embodiments, a central LED may be configured as a central point source provided behind a diffuser panel, e.g., collocated with the cross-member support fixture 230.

Diffuser 216 may comprise an suitably translucent material, e.g., plastic, woven or non-woven fabrics, or films, and may include perforations, vents, or other passages, e.g., for passage of wind, light, wiring, and the like. Similarly, back panel 234 may be made from any suitable material to support and/or cover LED strips 214.

In other embodiments, the tunnel may be formed as a curved arch that is separable or hinged at its apex. The arch may include an arcuate pipe frame and a fabric stretched over the pipe frame. The fabric panels may be stretched over the tunnel frame and may include any number of layers or coatings or other features such as air vents.

The crossmembers may be retained by the crossmember fixture in the stowed position, e.g., with two halves of the crossmember fixture being rotationally coupled to allow the crossmembers to rotate into alignment for storage. The light panels, base, and crossmembers are stackable and stowable in a case/bag for convenient storage and transport. For example, the collapsible light tunnel panels, crossmembers and fixtures may be configured to fit within a case of about 34×37×15 inches. When erected, the light tunnel can be set-up to provide a tunnel of about 111 inches wide, 88 inches tall, and 37 inches wide. In some embodiments, the angle of overhead panels may be adjusted to achieve a desired tunnel width and/or height. In some embodiments, the panels are fully separable. In some embodiments, some panels may remain hinged and folded when stowed. In some embodiments, LED electrical wiring may connect two separate panels when stowed.

In some embodiments, joint fixtures are positioned between the corner fixtures of adjacent panels to retain the panels in a fixed position/geometry. For example, joint fixtures may comprise projections or recess to mate with complementary features of adjacent panels.

A base may be used to provide additional stability and may include projections, recesses or other features to engage the lower light panels. The base may be foldable or otherwise compactable for ease of storage and transport.

The collapsible, modular light tunnel may be configured of any desired geometry to facilitate inspection of vehicles on-site. For example, panels may be rectangular, arcuate, or curved. Similarly, the light tunnel may include castors or rails to facilitate movement of the tunnel relative to a vehicle. Any number accessories may be attached to the tunnel, e.g., a control panel, work station, tool rack, cameras, and the like.

Accordingly, the present invention provides a collapsible mobile light tunnel for onsite inspection of damaged vehicles. The tunnel includes lightweight light panels collapsible coupled for movement between a stowed/stacked position and a deployed/erected position. Various alternative embodiments may include cameras for documenting damage, controls for changing the intensity, color or other quality of the light emitted from the light panels.

Similarly, while the present invention has been described herein as a collapsible light tunnel, the present invention may be readily used with any number of other devices now known or hereafter developed. Finally, while the present invention has been described above with reference to various exemplary embodiments, many changes, combinations and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A collapsible light tunnel for mobile on-site visual inspection of vehicle surface finishes, the collapsible light tunnel comprising:

first and second vertical side-member light panels sized and spaced to accommodate a passenger vehicle passed or parked therebetween;

first and second angled light panels; and first and second overhead light panels positioned to light top surfaces of a portion of a passenger vehicle passed or parked thereunder;

wherein the first vertical side-member light panel, first angled light panel and first overhead light panel are collapsibly coupled together and are movable between a first stowed position and a second deployed position;

wherein the second vertical side-member light panel, second angled light panel and second overhead light panel are collapsibly coupled together and are movable between a first stowed position and a second deployed position; and whereby the collapsible light tunnel in the second deployed position is sized and configured to accommodate a portion of a passenger vehicle passed or parked thereunder for visual inspection.

2. The collapsible light tunnel of claim 1, wherein the first angled light panel and first overhead light panel are sized and configured to collapse substantially within the boundaries of the first vertical side-member light panel and wherein the second angled light panel and second overhead light panel are sized and configured to collapse substantially within the boundaries of the second vertical side-member light panel.

3. The collapsible light tunnel of claim 2, wherein the respective first angled light panel, first overhead light panel and first vertical light panel are coupled into first half of the collapsible light tunnel and the second angled light panel, second overhead light panel and second vertical light panel are coupled into second half of the collapsible light tunnel.

4. The collapsible light tunnel of claim 3, wherein the first and second halves of the collapsible tunnel are separable from the other half for storage.

5. The collapsible light tunnel of claim 1, wherein respective light panels comprise strips of LED lights.

6. A collapsible light tunnel for mobile on-site visual inspection of vehicle surface finishes, the collapsible light tunnel comprising:

a plurality of side-member light panels comprising a plurality of LED lights and a diffuser and spaced to accommodate a passenger vehicle passed or parked therebetween;

at least one overhead light panel comprising a plurality of LED lights and a diffuser positioned light top surfaces of a portion of a passenger vehicle passed or parked thereunder; and wherein the plurality of side-member light panels and at least one overhead light panel are collapsibly coupled together and are movable between a first stowed position and a second deployed position;

whereby the collapsible light tunnel in the second deployed position is sized and configured to accommodate a portion of a passenger vehicle passed or parked thereunder for visual inspection.

7. The collapsible light tunnel of claim 6, wherein the plurality of side-member light panels and at least one overhead panel are configured to be stackable in the stowed position.

8. The collapsible light tunnel of claim 6, wherein the diffuser is stretchable over a fixed frame.

9. The collapsible light tunnel of claim 8, wherein the diffuser is secured to the frame in the stretched configuration by removable clips.

10. The collapsible light tunnel of claim 6, further comprising attachment fixtures configured to adjustably secure the first angled panel and the second angled panel in a selected angular position.

11. The collapsible light tunnel of claim 6, wherein the first overhead light panel, first angled light panel and first vertical light panel are stackable to fit within a footprint substantially corresponding to the perimeter of the larger of the first overhead light panel, first angled light panel and first vertical light panel.

12. The collapsible light tunnel of claim 6, wherein the diffuser comprises a stretchable, translucent fabric.

13. The collapsible light tunnel of claim 6, further comprising joint fixtures positioned between the first overhead light panel, first angled light panel and first vertical light panel and configured to retain the first overhead light panel, first angled light panel and first vertical light panel at a fixed position.

\* \* \* \* \*